United States Patent
Koinkar et al.

(10) Patent No.: US 6,719,608 B1
(45) Date of Patent: Apr. 13, 2004

(54) FABRICATION OF DEVICES WITH FIBERS ENGAGED TO GROOVES ON SUBSTRATES

(75) Inventors: Vilas Koinkar, Carlsbad, CA (US); Timothy C. Collins, Carlsbad, CA (US); Joannes M. Costa, Carlsbad, CA (US); Joseph A. Levert, Vista, CA (US)

(73) Assignee: Oluma, Inc., Carlsbad, CA (US)

( * ) Notice: Subject to any disclaimer, the term of this patent is extended or adjusted under 35 U.S.C. 154(b) by 28 days.

(21) Appl. No.: 10/126,930

(22) Filed: Apr. 19, 2002

Related U.S. Application Data

(60) Provisional application No. 60/285,223, filed on Apr. 19, 2001, provisional application No. 60/285,433, filed on Apr. 19, 2001, and provisional application No. 60/311,993, filed on Aug. 14, 2001.

(51) Int. Cl.[7] ............................................. B24B 49/00
(52) U.S. Cl. ......................................... 451/8; 451/460
(58) Field of Search .................... 451/6, 5, 8, 460; 385/30, 39, 41, 42, 48

(56) References Cited

U.S. PATENT DOCUMENTS

| | | |
|---|---|---|
| 4,307,933 A | 12/1981 | Palmer et al. |
| 4,315,666 A | 2/1982 | Hicks, Jr. |
| 4,431,260 A | 2/1984 | Palmer |
| 4,493,528 A | 1/1985 | Shaw et al. |
| 4,536,058 A | 8/1985 | Shaw et al. |
| 4,556,279 A | 12/1985 | Shaw et al. |
| 4,564,262 A | 1/1986 | Shaw |
| 4,601,541 A | 7/1986 | Shaw et al. |
| 4,688,882 A | 8/1987 | Failes |
| 4,900,118 A | 2/1990 | Yanagawa et al. |
| 4,991,922 A | 2/1991 | Dahlgren |
| 5,029,961 A | 7/1991 | Suzuki et al. |
| 5,100,219 A | 3/1992 | Takahashi |
| 5,533,155 A | 7/1996 | Barberio et al. |
| 5,586,205 A | 12/1996 | Chen et al. |
| 5,623,567 A | 4/1997 | Barberio et al. |
| 5,781,675 A | 7/1998 | Tseng et al. |
| 5,809,188 A | 9/1998 | Tseng et al. |
| 6,374,011 B1 * | 4/2002 | Wagoner et al. ............... 385/30 |
| 6,600,854 B2 * | 7/2003 | Anderegg et al. ............. 385/30 |

OTHER PUBLICATIONS

Tsujimoto, Fabrication of Low–Loss 3 dB Couplers with Multimode Optical Fibres, Mar. 1978, Eelctronics Letters.

* cited by examiner

*Primary Examiner*—Dung Van Nguyen
(74) *Attorney, Agent, or Firm*—Fish & Richardson, P.C.

(57) ABSTRACT

Fabrication techniques for polishing fibers engaged in grooves on substrates. A protection template assembly is disclosed to protect the unpolished portions of fibers. Chemical mechanical polishing may be used to achieve high fabrication throughput and high polishing uniformity. Optical monitoring may be used to monitor the polishing in real time.

33 Claims, 18 Drawing Sheets

FABRICATION OF DEVICES WITH FIBERS ENGAGED TO GROOVES ON SUBSTRATES

This application claims the benefits of U.S. Provisional Application No. 60/285,223 entitled "A METHOD OF PRODUCING FIBER OPTICAL COMPONENTS USING CHEMICAL-MECHANICAL PLANARIZATION TECHNIQUES" and filed on Apr. 19, 2001, U.S. Provisional Application No. 60/285,433 entitled "FUNCTIONAL POLISHING ENDPONIT DEVICE FOR OPTICAL CONTACT PORTS" and filed on Apr. 19, 2001, and U.S. Provisional Application No. 60/311,993 entitled "POLISHING TEMPLATE OR CARRIER TO HOLD COMPOSITE DEVICES CONSISTING OF OPTICAL FIBER AFFIXED TO A SUSTRATE" and filed on Aug. 14, 2001.

BACKGROUND

This application relates to fiber devices with fibers engaged in grooves on substrates, and in particular, to fabrication of such fiber devices.

Optical fibers can be used to guide light from one location to another. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism for spatially confining the optical energy of the light rays in one or more selected fiber modes to guide the optical energy along the fiber core. The guided optical energy in the fiber, however, is not completely confined within the core of the fiber. A portion of the optical energy can "leak" through the interface between the fiber core and the cladding via an evanescent field that essentially decays exponentially with the distance from the core-cladding interface. This evanescent leakage may be used to couple optical energy into or out of the fiber core, or alternatively, to perturb the guided optical energy in the fiber.

Fibers may be engaged to grooves on substrates such as V grooves in semiconductor substrates to form various fiber devices based on the evanescent leakage or coupling. A portion of the fiber cladding can be removed and polished to form a coupling window to allow for optical access to the fiber core via an evanescent field of a guided mode supported by the fiber.

SUMMARY

This application includes fabrication techniques and related devices for simultaneously polishing fiber cladding of an array of fibers positioned in grooves of a substrate in a wafer-level fabrication process to achieve a high throughput. In one embodiment, a chemical mechanical planarization (CMP) technique is adopted to perform the polishing and to control the amount of removed fiber cladding. A special protection template may be provided to hold the substrate with an array of fibers in position and to protect the fibers from being damaged by the polishing pad and to improve the polishing uniformity. In addition, optical monitoring may be implemented to monitor the polishing in real time.

DETAILED DESCRIPTION

The fiber devices of this application include one or more fibers integrated on or engaged to a substrate fabricated with one or more grooves. One portion of the cladding of each fiber is removed and polished to form a fiber coupling port with a surface that is sufficiently close to the fiber core so that optical energy can be coupled via evanescent fields out of or into the fiber core. Two or more such fiber coupling ports may be formed at different positions in each fiber when needed.

The following sections first describe the basic structures of fiber device modules which can be used as building blocks to form various fiber devices based on evanescent coupling. Next, techniques for fabricating such fiber device modules, including fabrication techniques based on the chemical mechanical planarization (CMP) and a fiber protection template, are described in detail.

Figure 1:
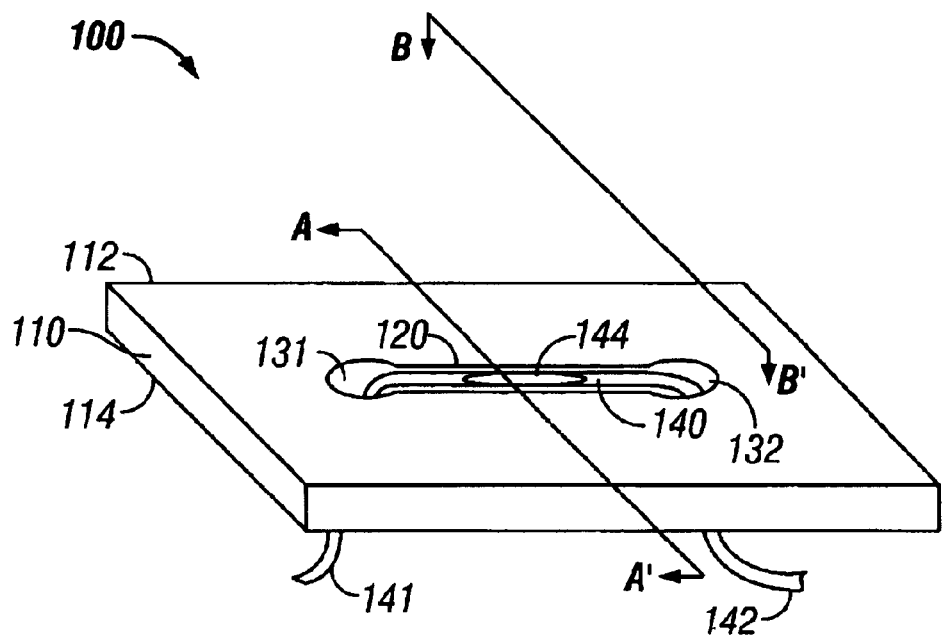
FIG. 1 shows one embodiment of a fiber device that integrates or engages a fiber to a substrate with a groove for positioning the fiber and openings for holding the fiber.
Figure 2A:
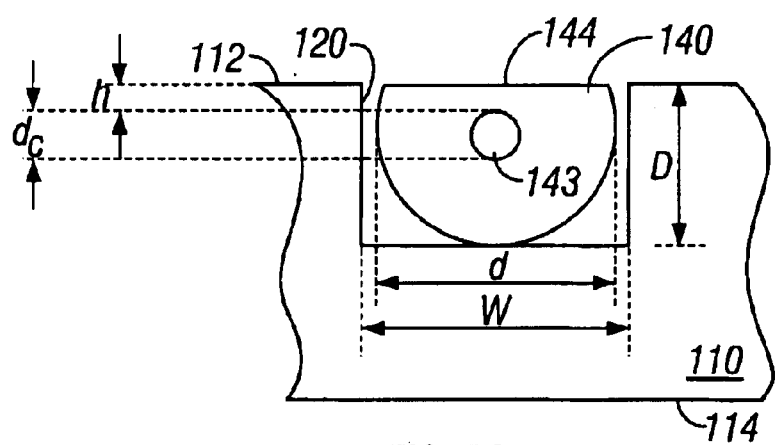
FIGS. 2A and 2B show a cross sectional view of the device in FIG. 1 along the direction AA' and a side view of the device in FIG. 1 along the direction BB', respectively.
Figure 2B:
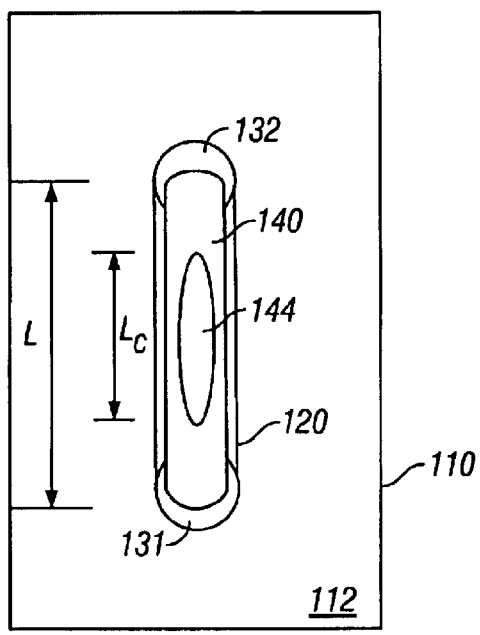

FIG. 1 shows one embodiment of a fiber device 100 where a fiber 140 is integrated or engaged to a substrate 110. The fiber device 100 may be used as a building block to construct a variety of fiber devices, including but not limited to, fiber optical monitors, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

Figure 2C:
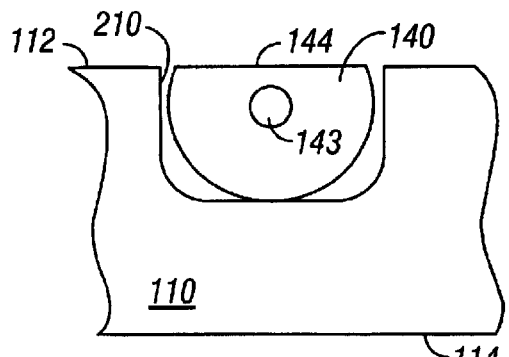
FIGS. 2C and 2D show examples of two different cross sections for grooves shown in FIG. 1.

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 220 in FIG. 2D. The cross sections are generally not so limited and may also be other shapes as well, including rectangular as shown in FIG. 2A, U-shaped as shown by the groove 210 in FIG. 2C, a circularly shape or other suitable shapes. Unless specifically indicated otherwise, the techniques, structures, and applications disclosed in this application are generally applicable to grooves of different shapes.

Figure 2D:
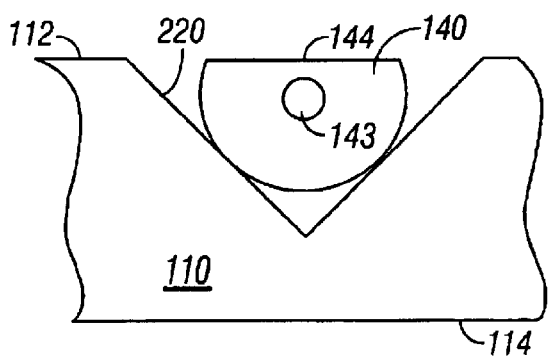
Figure 2E:
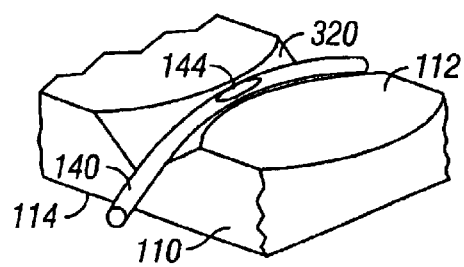
FIG. 2E shows one example of a V groove with varying depth and width.

The width, W, of the groove 120 is generally greater than the diameter, d, of the fiber 140 and may either remain a constant or vary spatially along the groove 120, e.g., increasing from the center towards the two ends as illustrated in the V groove 220 in FIG. 2E. The length, L, of the groove 120 may vary from one grove to another and can be determined based on specific requirements of applications. The depth D of the groove 120 may be a constant or may vary along the groove 120, e.g., increasing from the center towards the two ends as shown in FIG. 2E. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius $r=d/2$ and radius of the fiber core $r_c=d_c/2$. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications, the depth D of the entire groove 120 may be greater than fiber diameter d to avoid evanescent coupling of a guided mode. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than $(d+dc)/2$ while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length $L_c$ that is above the fiber core 143 and is substantially coplanar with the surface 112 of the substrate 110 as illustrated in FIG. 2B. When the spacing, h, between the flat surface 144 and the fiber core 143 is sufficiently small (e.g., on the order of or less than one wavelength of optical energy), the flat surface 144 can be used to couple optical energy into or out of the fiber core 144 through the evanescent fields outside the fiber core. Hence, the length, Lc, of the flat surface 144 approximately represents the optical coupling length for the fiber device 100. This coupling surface 144 may also be non-flat, e.g., curved to a certain extent, as long as it can transmit evanescent signals.

Alternatively, only one through hole 132 in the substrate 110 may be needed to engage the fiber 140 to form the fiber module for coupling with a waveguide module. As shown in the design 301 in FIG. 3A, the groove 120 may extend to one end side 310 of the substrate 110 so that one end 141 of the fiber 140 leaves the groove 120 without going through a through hole. In addition, FIG. 3B shows a conventional design 302 in which the groove 120 may extend to two opposing end sides 310 and 330 of the substrate 110 so that the fiber 140 is engaged to the groove 120 without relying on any through holes.

Figure 3A:
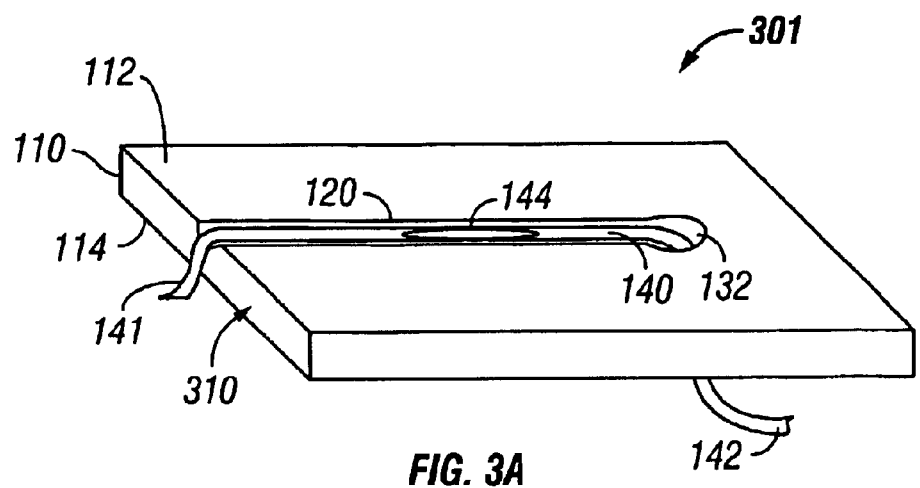
FIG. 3A shows a design to engage a fiber on to a substrate by using an elongated groove with a single through hole, where a portion of the fiber cladding is removed and polished to form a side-polished evanescent coupling port.
Figure 3B:
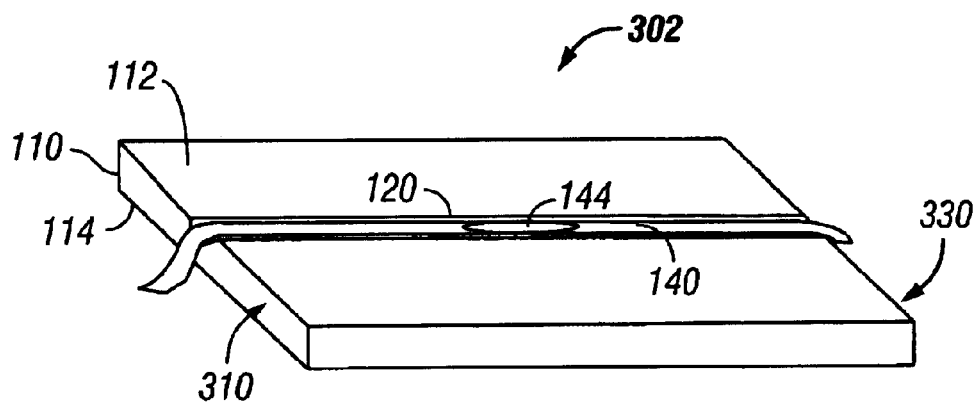
FIG. 3B shows another way of engaging a fiber onto a substrate without using through holes shown in FIG. 1, where a portion of the fiber cladding is removed and polished to form a side-polished evanescent coupling port.

Notably, the through holes in the substrate 110 shown in FIGS. 1 and 3A, may be used to engage a single fiber on both sides of a substrate to form two or more side-polished coupling ports for evanescent coupling. For example, two grooves may be formed on opposite sides of the substrate 110 to share a common through hole at ends. A fiber may be threaded through the substrate 110 to have one fiber portion in the groove on one side and another fiber portion in the groove on the opposite side of the substrate 110. Hence, fiber coupling ports may be formed in the same fiber on both sides of the substrate 110. This structure may be use to construct a variety of fiber devices, including stacking two substrates to provide optical coupling from a fiber in one substrate to another fiber in another substrate. The fabrication of this double-sided fiber structure may be implemented by polishing the substrate and the fiber on both sides as described in the following sections.

In fabrication of the above fiber device modules, a substrate, such as a silicon wafer, is first processed to form the desired grooves with or without the through holes. The grooves may be fabricated by first forming a patterned mask over the substrate to define the locations and shapes of grooves and subsequently etching the exposed portions of the substrate to form the grooves. The pattern mask is then removed to form the final patterned substrate with the grooves. The through holes may be fabricated along with the grooves, or alternatively, a separate process may be performed after the grooves are formed to fabricate the through holes. Grooves with two end through holes shown in FIG. 1, grooves with a single through hole at one end shown in FIG. 3A, or grooves without through holes at either ends shown in FIG. 3B may be fabricated on a single substrate. In general, grooves are arranged to be parallel to one another.

Figure 4:
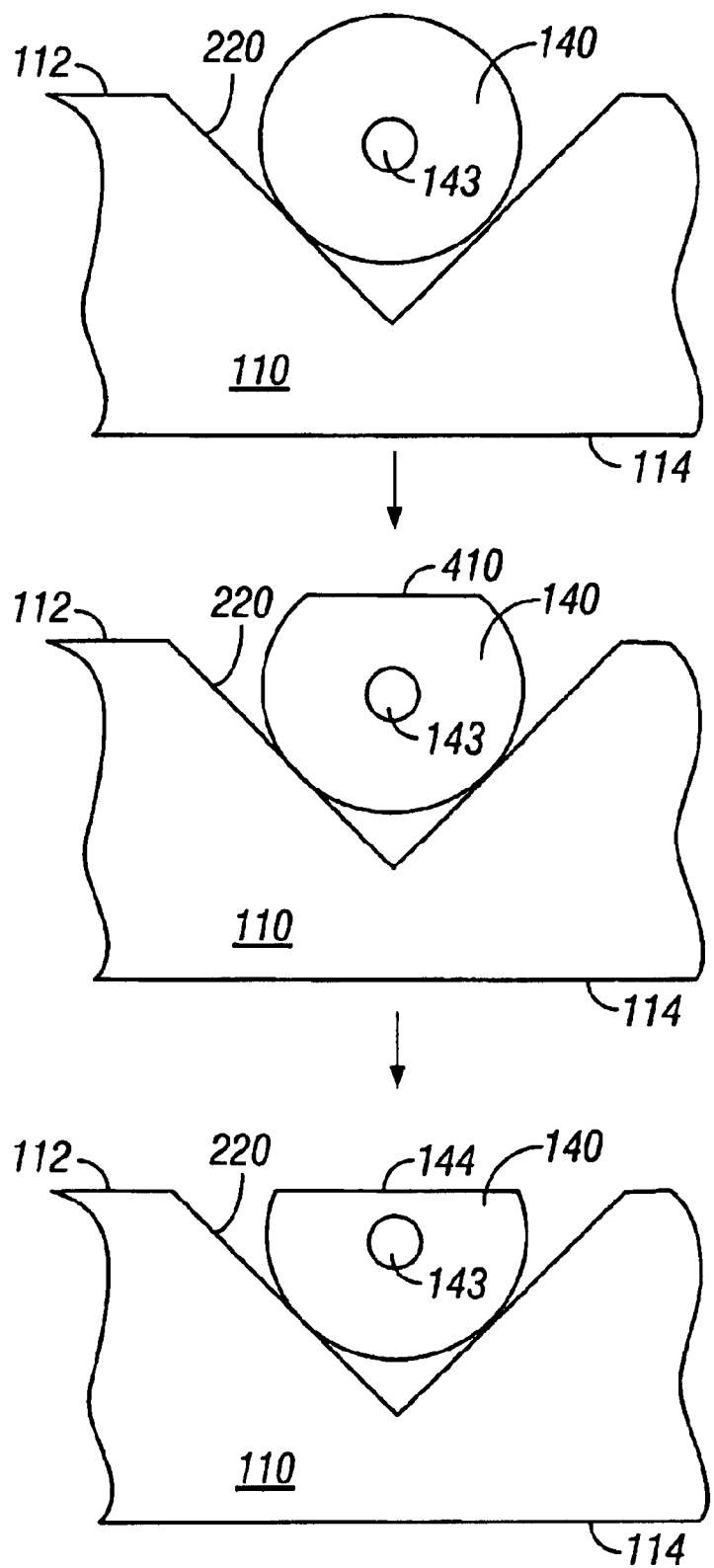
FIGS. 4 and 5 show two different cladding removal and polishing processes for different groove designs.

As described above, the groove, such as the V groove 220 in FIG. 2D, may be designed to have the proper depth so that the polished cladding surface 144 has the desired spacing from the fiber core 143 when substantially coplanar with the top substrate surface 112 after the protruded portion of the fiber cladding above the substrate surface 112 is removed and polished. FIG. 4 illustrates the fabrication steps for a side-polished fiber port based on this groove design where the top portion of the substrate 112 is essentially not removed during the polishing process. The protruded fiber cladding is removed at an intermediate stage to form an intermediate surface 410 above the substrate surface 112. The polishing process continues until the polished surface of the fiber becomes substantially coplanar with the surface 112 to form the final fiber port surface 144.

Figure 5:
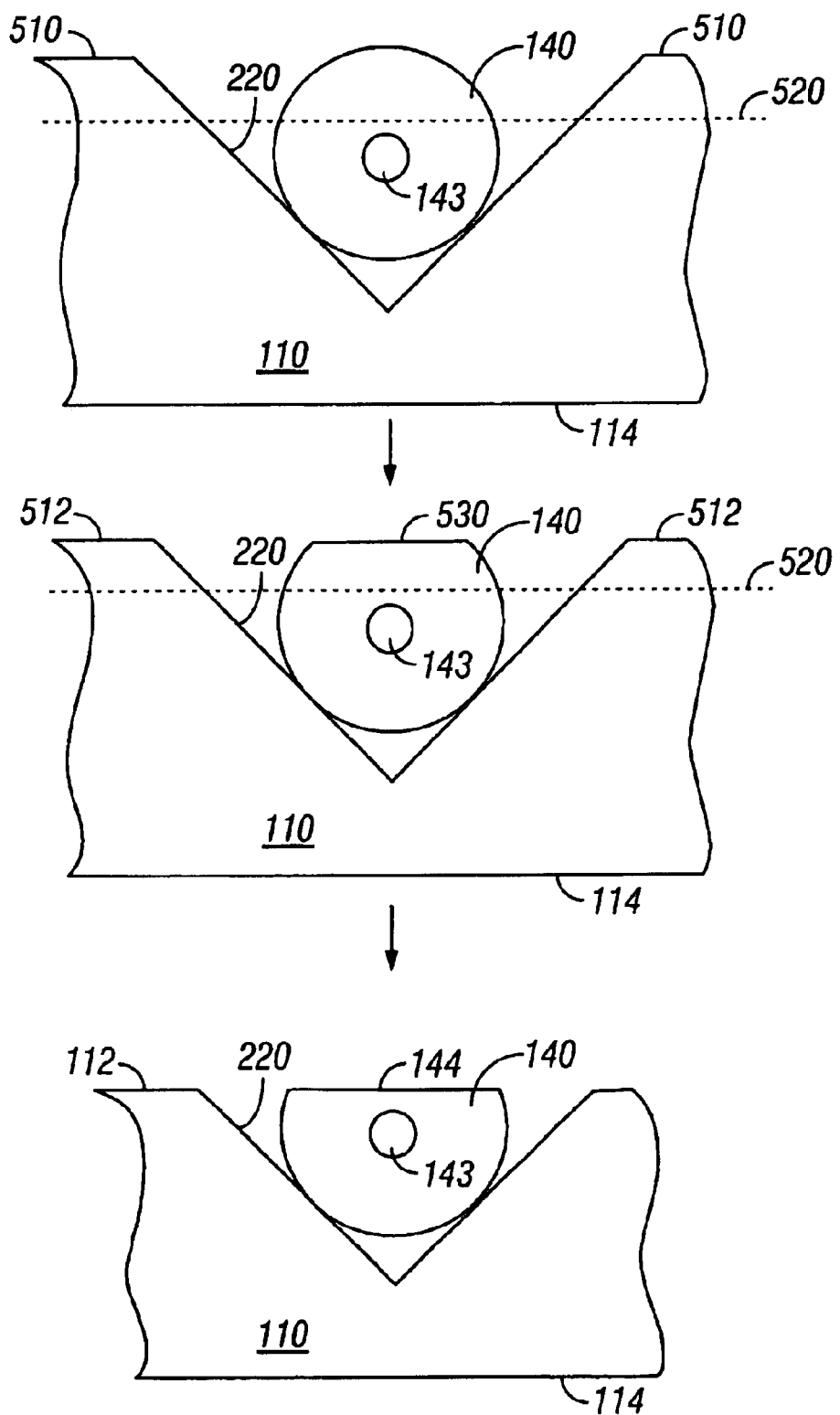

Alternatively, the groove 220 may be deeper than the design shown in FIG. 4 so that the top portion of the substrate 110 needs removal and polishing along with the fiber cladding. FIG. 5 shows this design and the corresponding polishing process. The substrate 110, prior to the polishing, has a top surface 510 that is above the desired substrate surface indicated by a dashed line 520. The fiber cladding, after being removed and polished to the dashed line 520, would form the desired polished coupling port surface 144. In fabrication, both the substrate 110 and the fiber cladding are removed and polished. At an intermediate stage, the fiber cladding is shown to have a surface 530 and the substrate 110 has a top surface 512 that is substantially coplanar with the cladding surface 530. The polishing continues until both the fiber cladding and the substrate 110 are at the level indicated by the dashed line 520 to form the coplanar surfaces 144 and 112, respectively.

Figure 6A:
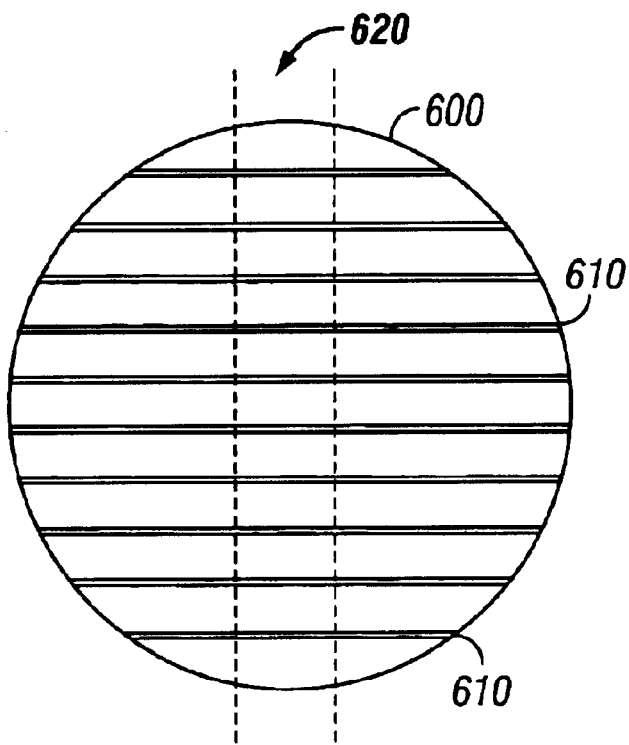
FIGS. 6A and 6B illustrate a substrate that is fabricated with parallel grooves without through holes for engaging an array of fibers.
Figure 6B:
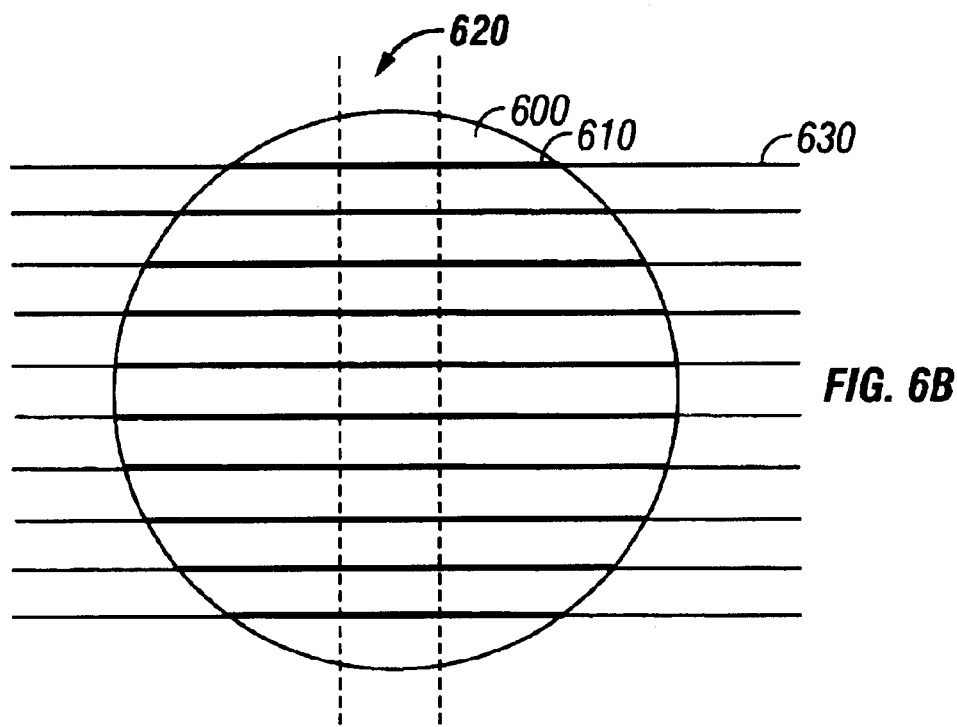

FIG. 6A shows a substrate 600 with an array of parallel grooves 610 without the through holes. The grooves 610 may have a varying depth where a shallow portion in the area 620 allows a portion of fiber cladding to be protruded above the substrate surface while other portions of each groove outside the area 620 are sufficiently deep to keep the fiber cladding below the substrate surface. Thus, only the protruded portion of each fiber is removed by polishing and other portions of each fiber remain intact by the polishing process. Alternatively, the grooves 610 may have shallow portions that are sufficiently deep so that both the top part of the substrate and the fiber cladding located in the shallow portion need removal and polishing as described with respect to FIG. 5. FIG. 6B shows that, an array of fibers 630 are placed in the parallel grooves 610. In general, the fibers 630 may be fixed to the respective grooves by, e.g., bonding at least a portion of each fiber to the groove.

Figure 7A:
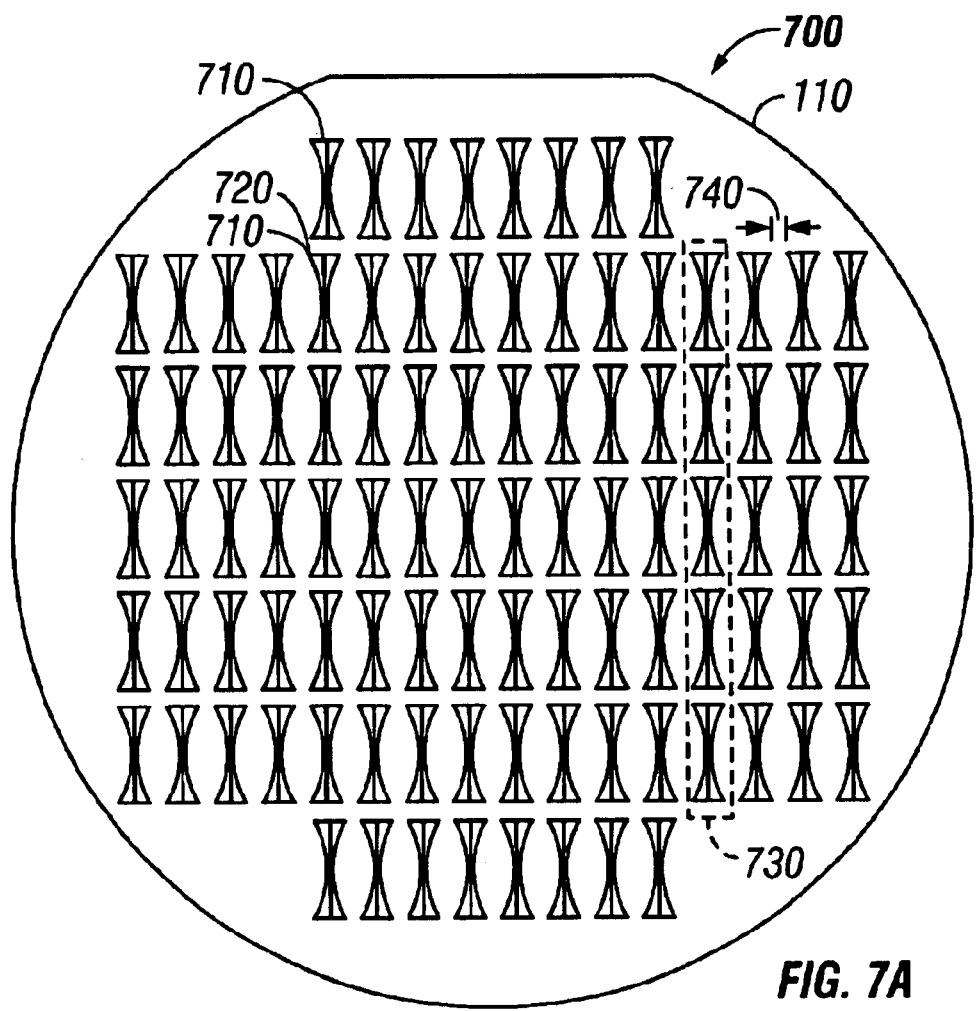
FIG. 7A shows a substrate that is fabricated with an array of grooves with openings on one side of the substrate.
Figure 7B:
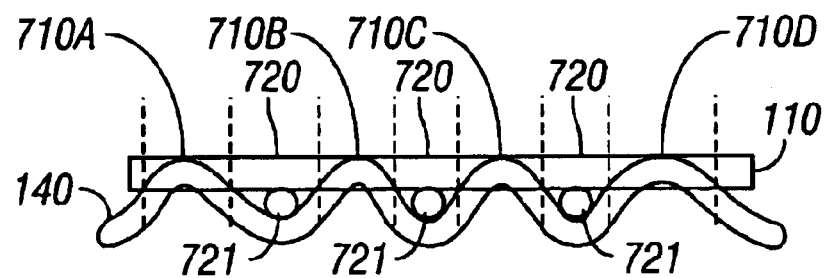
FIG. 7B shows a side view of the device in FIG. 7A where two or more grooves are aligned with each other along a straight line on a single side of the substrate and a fiber is threaded through the grooves with support elements on the opposite substrate surface to avoid sharp bending of the fiber.

FIGS. 7A and 7B show a fiber device 700 that has grooves 710 with two end openings formed on one side of the substrate 110. The grooves 710 may be aligned to be parallel to one another along their elongated directions and are arranged to form multiple parallel columns 730 with a spacing 740. Within each column 730, multiple grooves 710 may be spaced from one another by a spacing 720. A single fiber can be threaded through each column 730 of grooves 710 and an array of fibers can be threaded through the parallel columns 730, respectively. FIG. 7B shows an example where the fiber 140 is threaded through V grooves 710A, 710B, 710C, and 710D formed along a straight line on the surface 112 of the substrate 110. A spacer 721, such as a rod, may be optionally positioned on the surface 114 between the openings of two adjacent V grooves to provide a support to the fiber 140. Such support may be used to reduce sharp bending of the fiber 140 which may damage the fiber 140. After completion of polishing to remove the fiber cladding, a coupling port is formed at each V groove on the surface 112. Next, the substrate 110 may be diced into multiple units each having one or more grooves 710. Such units can be used to form various fiber devices. Hence, a batch fabrication process may be used to process the substrate 110 and to simultaneously form multiple fiber devices with V grooves 710.

Referring back to FIG. 1, the groove 120 with its two openings 131 and 132 may be formed on both sides 112 and 114 of the substrate 110 in the following manner. First, two adjacent grooves respectively formed in different sides of the substrate are aligned along the same groove direction. Second, the groove on one side shares an opening with the adjacent groove on the opposite side of the substrate 110. Techniques such as the double-sided photolithography may be used to form the V grooves on both surfaces of the substrate. Unlike the fiber device shown in FIG. 7B where the coupling ports are only on a single side of the substrate, a substrate with V grooves on both sides can form a fiber device with coupling ports on both sides of the substrate. Such double-sided coupling capability can provide flexible and versatile coupling configurations in various fiber devices.

Figure 8A:
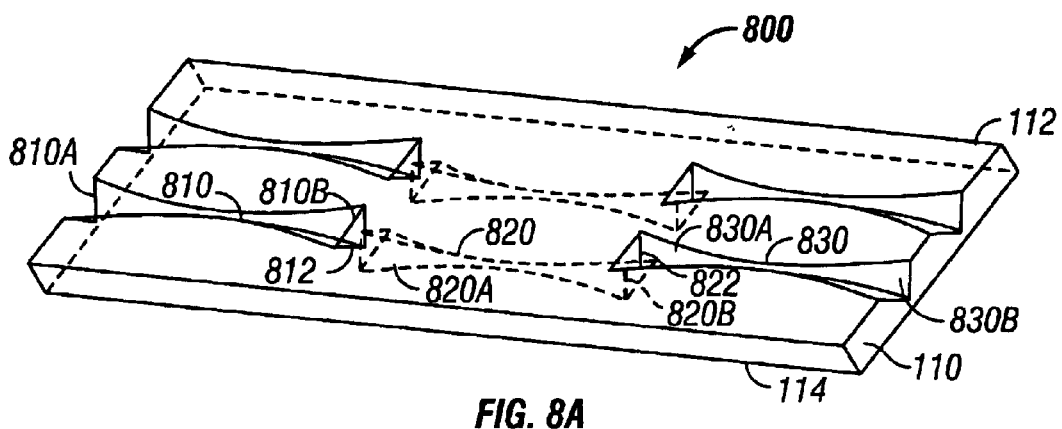
FIGS. 8A, 8B, and 8C illustrate substrates that are processed with grooves on both substrate surfaces.
Figure 8B:
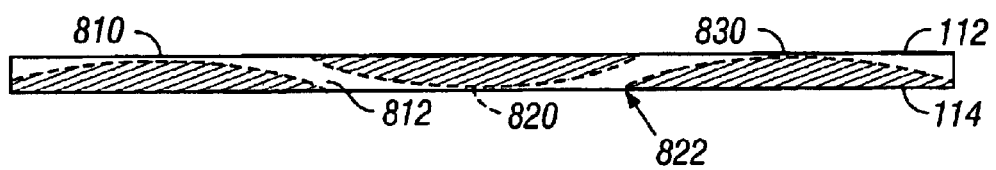
Figure 8C:
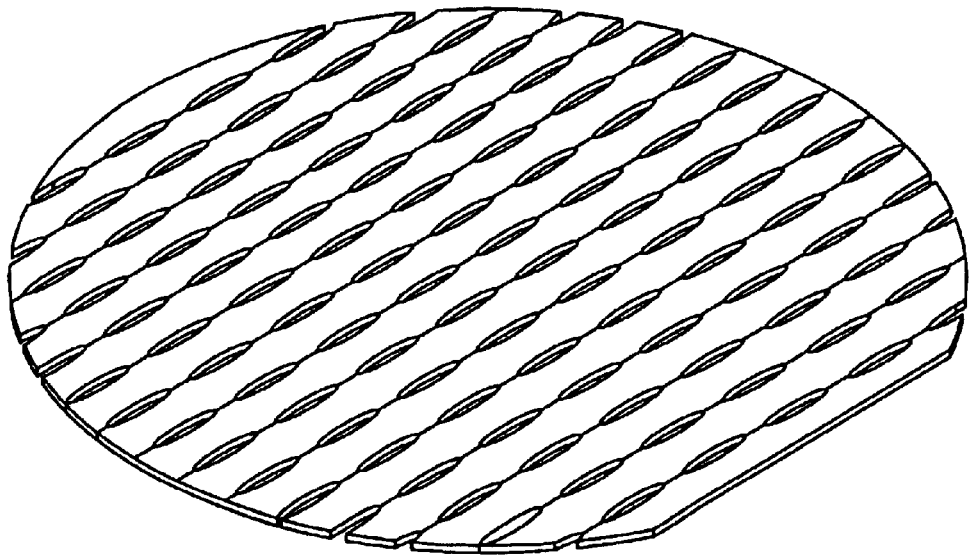

FIGS. 8A and 8B illustrate one example of a fiber device 800 that has V grooves on both sides 112 and 114 of the substrate 110. A first V groove 820 is formed on the side 114. Similar to the V grooves in FIG. 2E, the depth and width of the V groove 820 increase from its center towards both ends 820A and 820B. A second, similar V groove 810 is formed on the opposite side 112 along the same groove direction. The end 810A of the second groove 810 overlaps with the end 820A of the first V groove 820 to create a through hole 812 that connects the V grooves 810 and 820. A third V groove 830 is also shown on the side 112 to have one end 830A overlap with the end 820B of the V groove 820 on the opposite side 114. A through hole 822 is then formed at the overlapping region to connect the V groove 820 to the V groove 830. Similar to the batch fabrication of the single-sided devices shown in FIG. 7A, multiple double-sided devices may also be simultaneously fabricated from a single-sided substrate as illustrated in FIG. 8C where multiple parallel columns of V grooves are formed on both sides of the substrate. A fiber may be threaded through the through holes to be engaged to the V grooves on both sides of the substrate in each column by, e.g., bonding. The assembly is then polished on both sides to form fiber coupling ports. Finally, the assembly is diced into smaller units for forming desired fiber devices.

The removal of the fiber cladding may be generally achieved by polishing the fiber cladding. Various polishing processes may be used such as mechanical polishing and chemical mechanical polishing (CMP). It is recognized that, in any polishing process, the unpolished portions of the fibers engaged to the substrate and fibers extended from substrate need to be protected from the polishing process and remain intact so that only one or more selected portions of each fiber are polished. Any damage to the unpolished portions of a fiber in the device may adversely affect the performance and reliability of the finished device or even lead to device failure. Therefore, a protection template assembly is specially designed to hold the substrate and the fibers engaged to grooves on the substrate so that only the fiber portions to be polished are exposed and other portions of the fibers are shielded. The protection template located with the substrate and the fibers engaged thereto is then placed in a polisher for polishing. Upon completion of the polishing, the protection template assembly is removed from the polisher and the assembly of the fibers and the substrate is then removed from the protection template assembly for further processing.

Figure 9A:
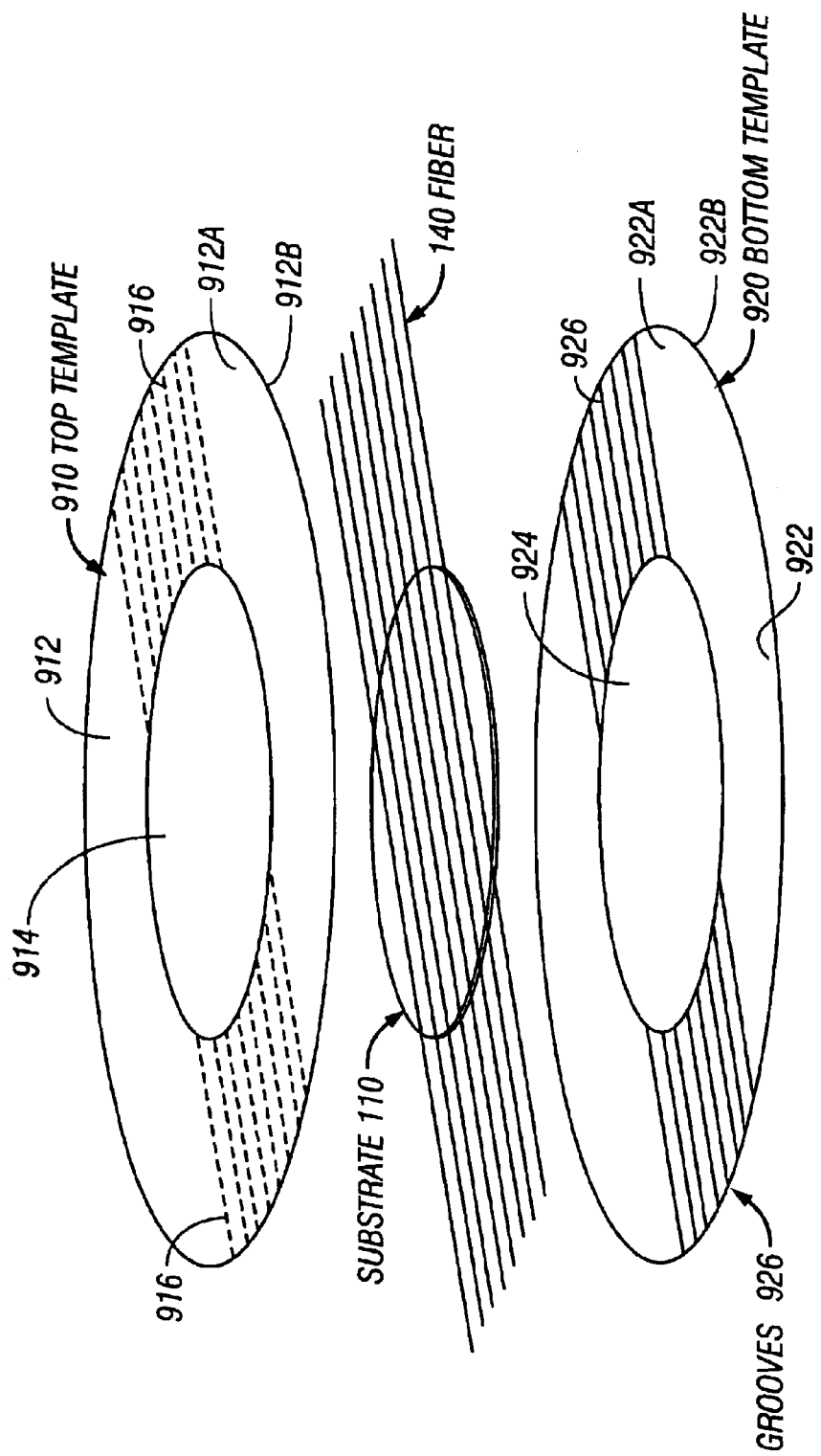
FIGS. 9A and 9B show one embodiment of the protection template to hold the substrate and protect fibers, where dashed lines the top template represent fiber grooves formed on the bottom surface of the top template.
Figure 9B:
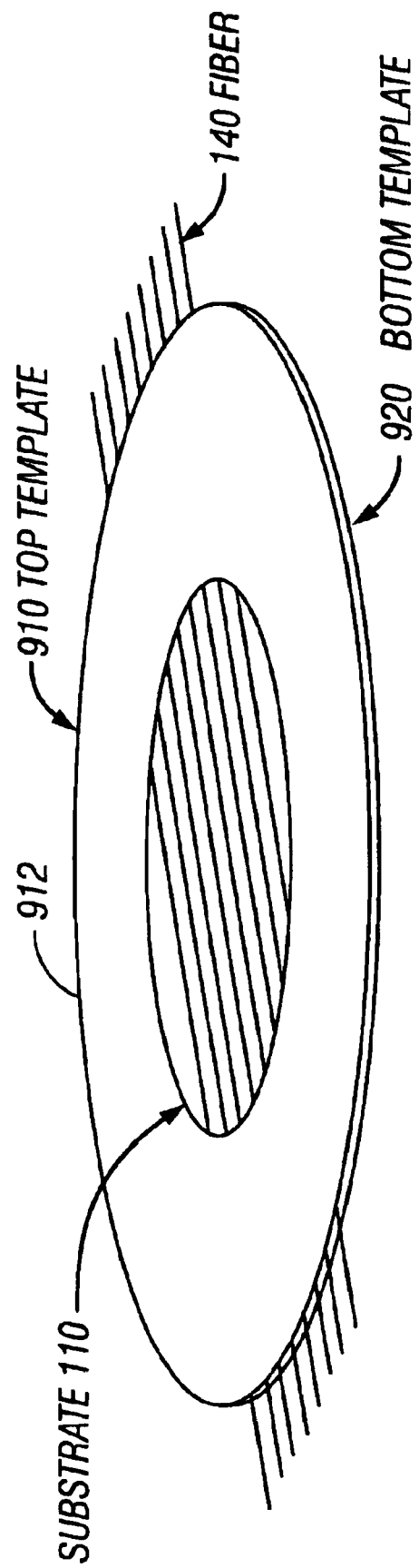

FIGS. 9A and 9B show one embodiment of the protection template assembly 900, where FIG. 9A shows components of the protection template assembly 900 and FIG. 9B shows the protection template assembly 900 located with the substrate and the engaged fibers. The protection template assembly 900 includes a top template 910 and a bottom template 920 that are shaped according to the geometry of the substrate 110. In the illustrated example where the substrate 110 is a disk, the templates 910 and 920 are accordingly shaped to have a ring geometry. The top template 910 is a ring with a peripheral ring portion 912 and a central circular opening 914. The central circular opening 914 has a diameter slightly larger the diameter of the substrate 110 so that the substrate 110 can be held in the openings 914 and 924. The outer diameter of the peripheral ring portion 912 is set to have sufficiently amount of fibers 140 extended outside the substrate 110 to be protected. The peripheral ring portion 912 has a top surface 912A and a bottom surface 912B. The bottom surface 912B is fabricated with an array of grooves 916 on both sides of the central circular opening 914 to receive the fibers 140 extended outside the substrate 110. The grooves 916 may be arranged to substantially coincide with the parallel columns of grooves formed on the substrate 110 so that the extended portions of the fibers 140 are naturally placed in the grooves 916 without significant bending. The bottom template 920 is symmetrically constructed with a substantially identical central circular opening 924, a substantially identical peripheral ring portion 922, and matching grooves 926 on the top surface 922A on both sides of the opening 924 to match the grooves 916 on the bottom surface 912B of the top template 910.

In operation, the substrate 110 with fibers 140 are placed between the top and bottom templates 910 and 920, where the substrate 110 is in the central openings 914 and 924 and the extended portions of the fibers 140 are placed in the grooves 926. The top template 910 is then conformingly placed on top of the bottom template 920 so that the central opening 914 is aligned with the central opening 924 and the groove 916 match the grooves 926. At this position, the extended portions of the fibers 140 are sandwiched between the grooves 916 and 926. The top and bottom templates 910 and 920 are then pressed against each other to hold the extended portions of the fibers 140 so that the substrate 110 is fixed in position and is suspended within the openings 914 and 924. This design allows for holding of substrates of various sizes, shapes and thickness values. As illustrated in FIG. 9B wherein the protection template assembly 900 is loaded with the substrate 110 and the fibers 140 engaged to the substrate 110, the portions of the fibers in the substrate 110 and the substrate 110 are exposed in the openings 914 and 924. The extended portions of the fibers 140 outside the substrate 110 are sandwiched between the templates 910 and 920 and thus are protected from being contacted during the polishing process. Bonding materials such as wax, epoxies and other adhesives may be used to hold substrate in the fixture and hold top template 910 and bottom template 920 together. Since both sides of the substrate 110 are exposed when held by the template 900, polishing on both sides of the substrate can be achieved by, e.g., using a double side polishing system with two polishing pads, or, by polishing one side first and then flipping the template to polish the other side. Materials such as glass-reinforced epoxies, glass materials, polymers, semiconductors, metals, metal oxides and alloys and their composites may be used to fabricate the templates.

Figure 9C:
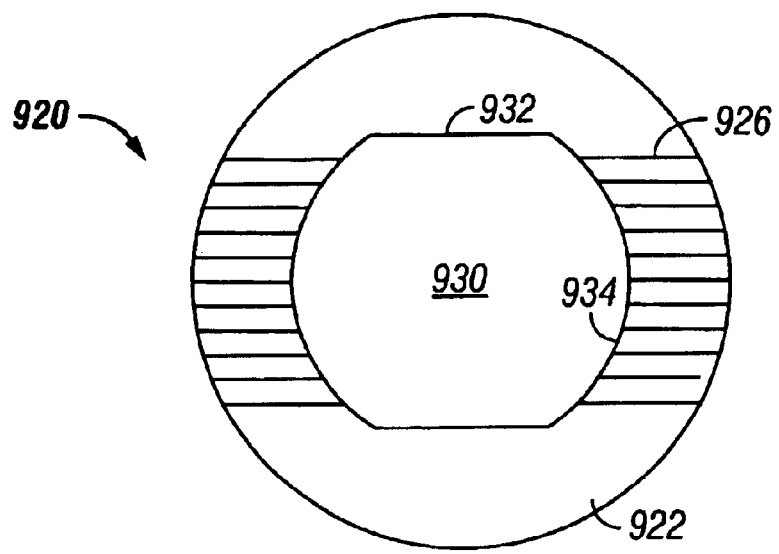
FIG. 9C shows another template plate with a non-circular inner opening to restrict rotation of the substrate according to one embodiment.

FIG. 9C shows that the central opening of each template plate may be shaped to restrict the rotational motion of the substrate 110 when engaged to the template assembly. This rotation of the substrate 110 causes tension or stress in the fibers and may damage or break the fibers. Instead of having a circular opening 914 or 924, the opening may be designed to have at least one straight side to limit the rotational motion of the substrate. In FIG. 9C, the bottom template plate 920 is shown to have an opening 930 with two parallel straight sides 932 on opposite sides of the center. The remaining sides 934 are partial circular arcs. The top template plate 910 is similarly designed to match the bottom template plate 920. Accordingly, the shape of the substrate 110 is also cut in a similar geometry. The straight sides 932 prevent the substrate 119 from rotating. Other shapes for the opening with at least one straight side may also be used, such as rectangle, square and noncircular shapes.

Figure 9D:
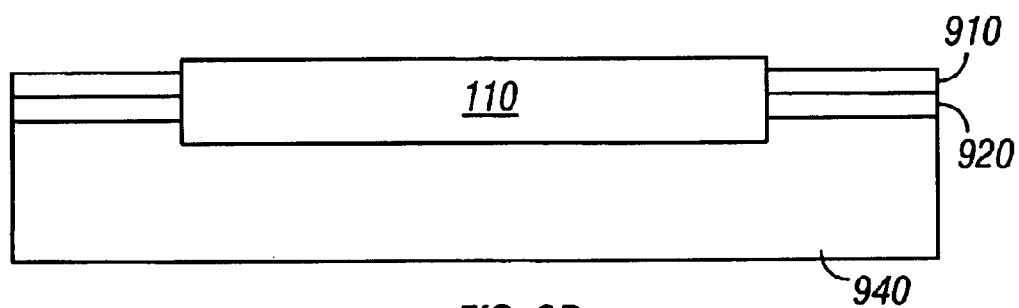
FIGS. 9D and 9E shows mounting of the template assembly with a backing support.
Figure 9E:
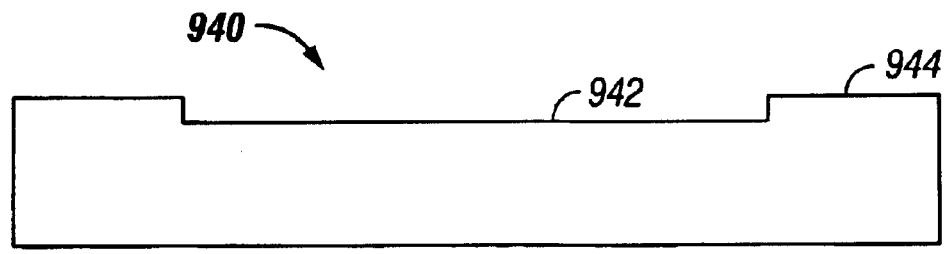
Figure 9F:
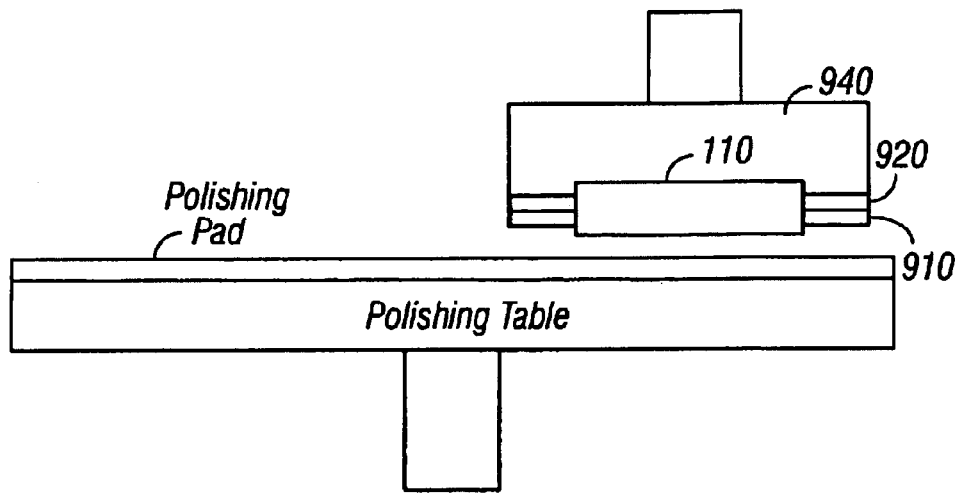
FIGS. 9F and 9G show two different polishing configurations using the template assembly shown in FIG. 9A.

FIG. 9D shows mounting of the substrate 110 held by the template assembly 900 by using a backing support 940. FIG. 9E shows a cross sectional view of the backing support 940 which has the central indentation 942 shaped to receive substrate 110 and the peripheral region 944 above the central indentation 942 to support the template assembly 900. In one implementation, the polishing substrate 110 and protection template may be held in central region 942 and the peripheral region 944, respectively, by an adhesive material or wax. A backing layer 945 may also be used in the central indention 942 to hold the substrate 110 and improve polishing uniformity. The backing film may be adhered in the central indentation 942 using a suitable bonding method, such as a double-sided pressure sensitive adhesive, epoxies and adhesives. Such a backing film 945 may be porous and compressible to provide a conforming contact to the backside of the substrate under polishing. Compressibility of the backing film may be in the range of about 1% to about 50% and more preferably about 15%. A polyurethane material may be used to construct the backing film. FIG. 9F shows polishing of the substrate on one side by using the above template assembly system 900.

Figure 9G:
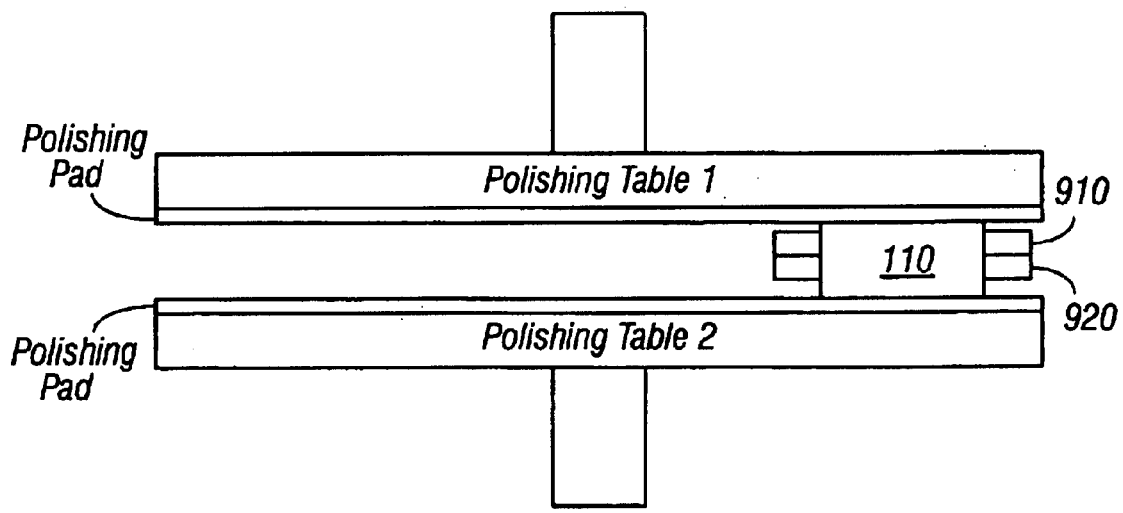

The template assembly 900 may also be used for simultaneous polishing of both sides of the substrate 110. FIG. 9G shows two polishing pads 1 and 2 are mounted on top and bottom polishing tables and then positioned to contact both top and bottom surfaces of the substrate 110 held by the template assembly 900. Both polishing pads are pressed against the substrate 110 from the opposite sides and rotate to polish the substrate 110. Polishing tables can be rotated in the same direction or opposite directions. A polishing material, such as a polishing slurry or a polishing solution, may be delivered to the contact region between the substrate 110 with fibers and the polishing padthrough central region of the top polishing table to facilitate or assist the polishing.

Figure 9H:
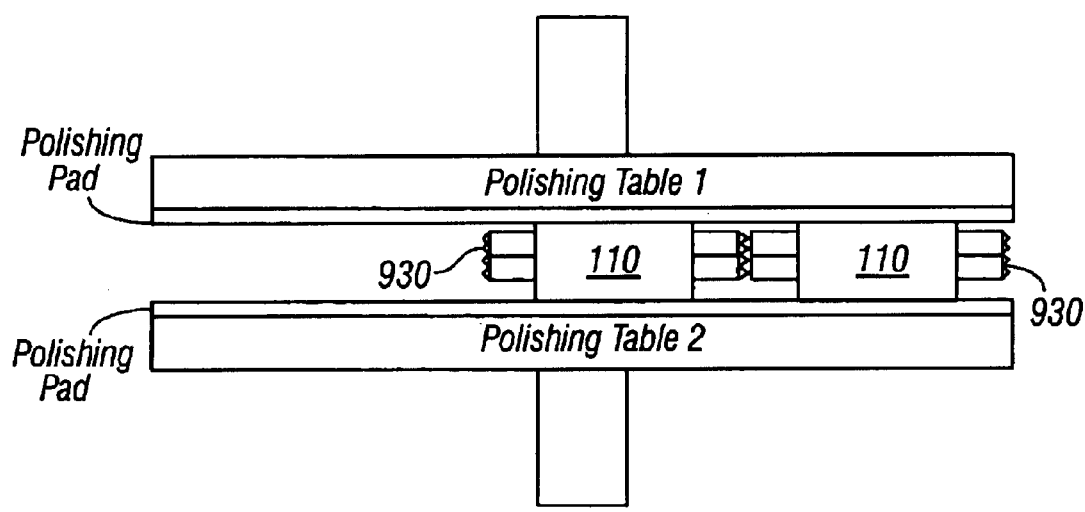
FIG. 9H illustrates a technique for polishing multiple substrates in template assemblies by edging adjacent assemblies with edge gears.

Notably, multiple substrates may be polished by engaging templates to each other with gears 930 formed around the edge of each template. FIG. 9H illustrates this technique. Two adjacent templates engage together by gears 930 formed on the edges of the templates and rotate in opposite directions with respect to each other.

Figure 10:
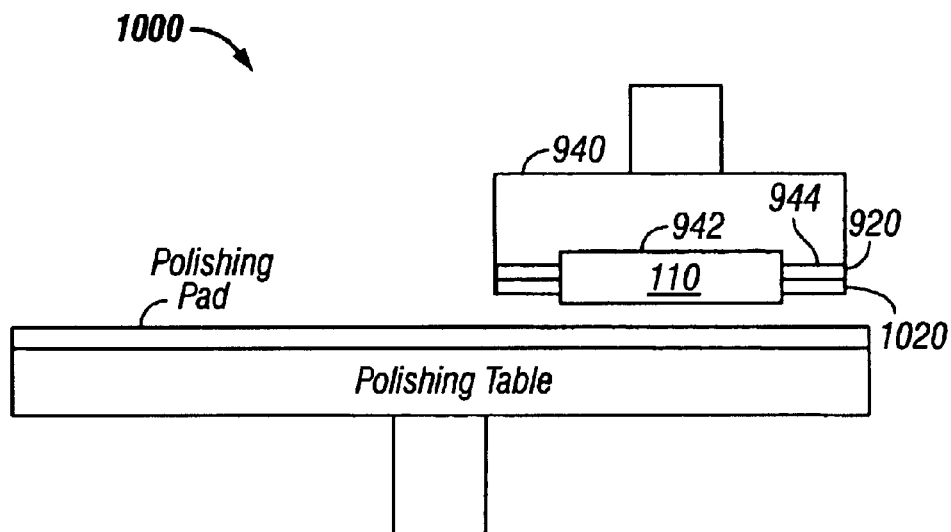
FIG. 10 shows another embodiment of a template assembly for holding a single-side substrate for polishing.

FIG. 10 shows one embodiment 1000 of a system where the only one template plate 910 is used to hold a substrate 110 by placing the extended fibers in the grooves formed in one surface of the template plate 910. A layer of wax or an adhesive may be applied above the fibers in the grooves of the template plate 910 for fixing the position of the fibers and the substrate 110. The template 910 may be mounted on the polishing chuck using an adhesive or a wax. This unit is then placed above the backing support 945 to place the substrate 110 in the central indentation 942 while resting the template assembly 900 on the peripheral region 944. This system may be used for polishing a portion of a fiber in a groove on only one side of the substrate. Alternatively, in polishing both sides of the substrate 110, the substrate 110 may be flipped and remounted to the template 910 to allow for polishing the other side.

The basic effect of CMP is to planarize a non-planar surface. CMP accomplishes this by pressing the surface to be planarized that is held on a rotating carrier against a polishing pad attached to a rotating platen. A polishing slurry or solution is transferred into the contact region between the surface to be planarized and the polishing pad to assist the removal of the material and the polishing of the surface. The slurry may be formulated with an abrasive material suspended in an etchant solution. This slurry can chemically react with the substrate surface and thus the resultant chemically-modified surface layer may be removed easily by the mechanical abrasive action. The mechanical abrasive action can also enhance the chemical reaction between slurry and substrate surface and hence material removal phase. The slurry then acts to dissolve the detritus or residue, or to remove it by flushing. The transport of the slurry to and from the surface is accomplished by means of a specially formulated polishing pad. Abrasive free polishing solution can be used with conjunction of polishing pad with or without embedded abrasive materials.

Figure 11:
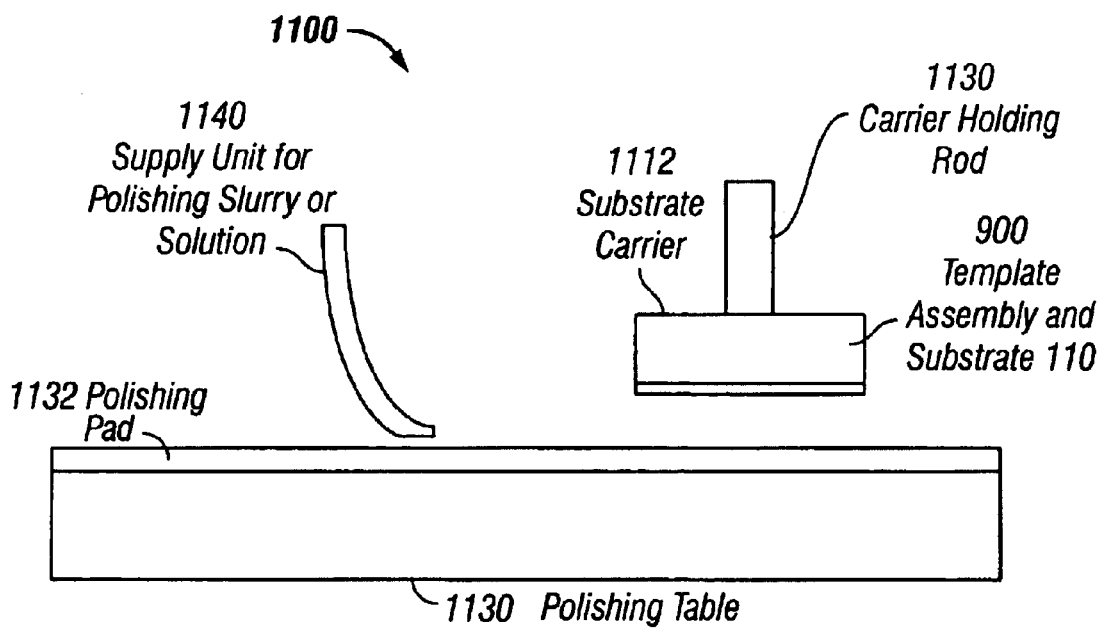
FIG. 11 illustrates a chemical mechanical polishing system that holds a substrate with fibers in grooves by using a protection template.

FIG. 11 shows a CMP system 1100 that uses the protection template assembly 900 in FIGS. 9A through 9D for holding a substrate with fibers. The system 1100 has a polishing platen or table 1130 that has a polishing pad 1132 formed or mounted on top. The platen 1130 may rotate during polishing. A wafer carrier 1112 is movably positioned above the polishing pad 1132 and has a surface facing the polishing pad 1132 to hold the protection template assembly 900. A carrier holding rod 1130 is engaged to the wafer carrier 1112 to rotate the wafer carrier 1112 against the rotation of the polishing pad 1132. A slurry supply unit 1140 is positioned over the polishing pad 1132 to supply the polishing slurry or solution during polishing.

Figure 12:
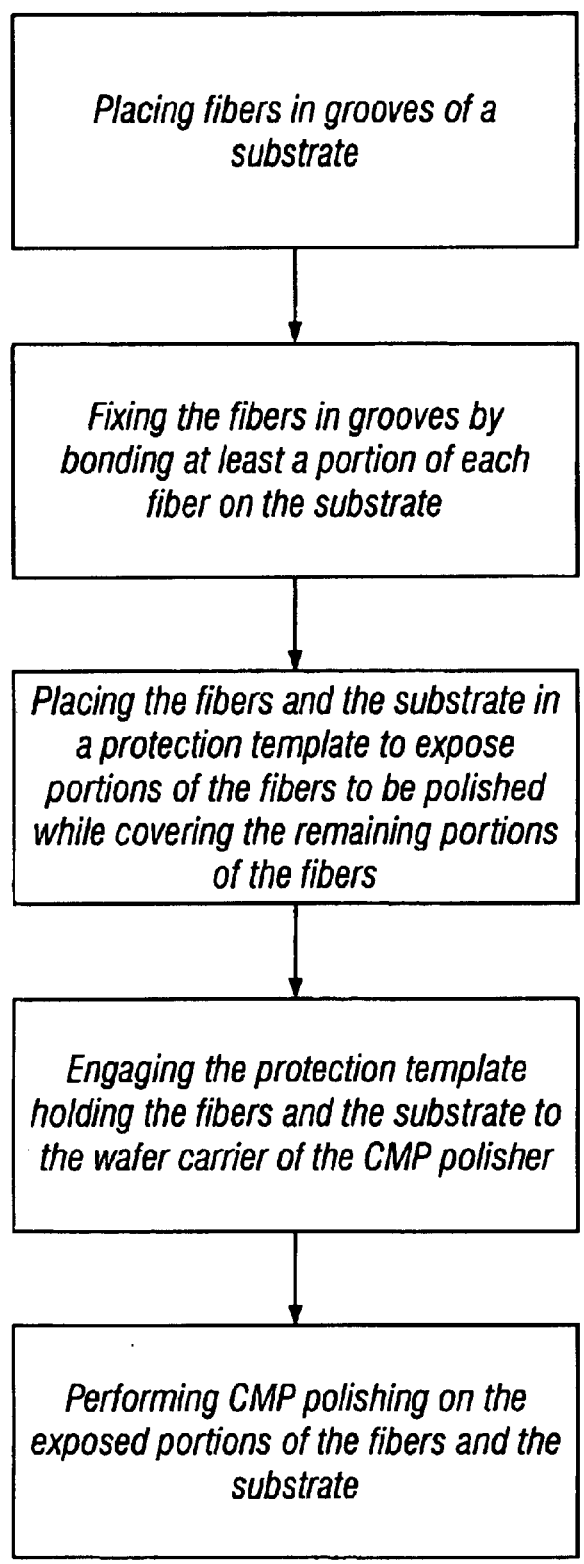
FIG. 12 is a flowchart showing one embodiment of the fabrication process.

FIG. 12 further shows one operational flow of polishing. In operation, the wafer carrier 1112 and the polishing pad 1132 are positioned close to each other to press the exposed substrate 110 and fibers 140 held by the protection template assembly 900 against the polishing pad 1132. The protruded portions of the fibers above the substrate surface are therefore polished away until the polished surface of the fiber cladding is substantially coplanar with the substrate surface. If there are grooves on both sides of the substrate 110, the protection template assembly 900 is flipped after one side is polished to face the unpolished side to the polishing pad for the second polishing.

This use of CMP technique for polishing fiber devices have a number of advantages. For example, the same slurry and pad may be used to polish fibers in a single step, without mechanical grinding with multiple size of abrasive particles of different particle sizes. The CMP process can be operated at a high speed, e.g., at about 30 minutes for polishing one substrate with fibers. Multiple wafers can be polished on the same machine to improve the overall fabrication throughput. The throughput can be further improved by increasing the spatial density of the fibers on the substrate. CMP can also be controlled to achieve high polishing uniformity by properly adjusting and controlling the distance between core and polished surface precisely. Fibers are side-polished uniformly so that distance between core and polished distance is uniform over the wafer or substrate. The substrate material can be selected to have a removal rate much less than that of the fiber cladding in CMP so that the substrate surface is used as an automatic stopping marker for the polishing. In addition, the substrate surface may be coated with a layer formed of a material different from the substrate, e.g., a metal, a metal oxide, a metal nitride, a silicon nitride, a silicon oxide, an alloy or a composite material, to improve the removal rate selectivity. The thickness of this layer may be used to achieve better planarization uniformity across the substrate and/or monitor the progress of the process by measuring the rate at which this layer is removed. Moreover, it is possible to achieve better surface finish without or negligible sub surface damage.

It is further recognized that, a polyurethane hard pad and a soft pad with slurry may be stacked together to achieve local and global planarity. The soft pad provides a support and the hard pad is in direct contact with the substrate and the fibers to perform the polishing. Multiple layers of pads may be stacked to achieve desired CMP performance, e.g., having two soft pads stacking with each other to support the hard pad. The compliance of the pad and the mounting techniques may be optimized for uniformity. The rate of removal of the fiber material may be optimized by varying the pressure, the relative velocity of the fiber and the polishing pad the formulation of the slurry and rate of the slurry dispensing on the pad. A polishing pad may be designed to have a patterned polishing surface, e.g., with grooves, to improve the polishing performance. A polishing pad may also be embedded with abrasive particles in the polishing surface to achieve desired polishing and planarization uniformity. The abrasive particles may include one or more types of particles such as silica particles, alumina particles, ceria particles, metal oxide particles, nitride particles, carbide particles, alloy particles, diamond particles, and various composite particles. Alternatively, the polishing pad may be made without the abrasive particles or without the patterns on the polishing surface. Typical slurry flow for fiber polishing may be set within the range of from few milliliters per minute (ml/min) to few hundred ml/min and may be at about 100 ml/min. The polishing material, such as a polishing slurry or a polishing solution, may have a pH value in a range from about 2 to about 12. The pressure for pressing the substrate against the polishing pad may be from about 0.1 to about 10 psi or 20 psi (e.g., about 7 psi). The carrier and polishing table speeds may be set in the range from about 1 rpm to about 200 rpm, preferably between about 10 to about 50 rpm. The carrier and polishing table speeds may be optimized to achieve better polishing uniformity.

In the above techniques and systems for polishing fibers engaged to a substrate, it is desirable to provide a monitoring mechanism to monitor and measure the thickness remained between polished cladding surface and core during the polishing process. This monitoring mechanism would allow for accurate control of the polishing system to stop polishing when a desired amount of fiber cladding is removed. Notably, since the monitoring mechanism operates in real time during the polishing, the remaining fiber cladding is constantly monitored throughout the polishing. Hence, this monitoring mechanism may be used to overcome the shortcoming of a polishing system that terminates polishing according to a preset polishing time without actual measurement of the fiber cladding.

The following sections describe two exemplary implementations of a fiber polishing monitoring mechanism that constantly monitors the polishing to allow the operator to determine the desired "endpoint" for terminating the polishing. Depending on the specific applications for the side-polished fiber ports, the distance between the final polished fiber port surface and the fiber core may vary from one device to another because the amount of evanescent coupling may vary. In some commercial fibers, the fiber core is about 10 μm in diameter. The intensity of light coupled into the fiber form the side-polished cladding surface or guided light leaking out of the side-polished cladding surface is a function of the distance between the side-polished cladding surface and the fiber core. Hence, the distance between the side-polished cladding surface and the fiber core may be optically monitored.

Figure 13:
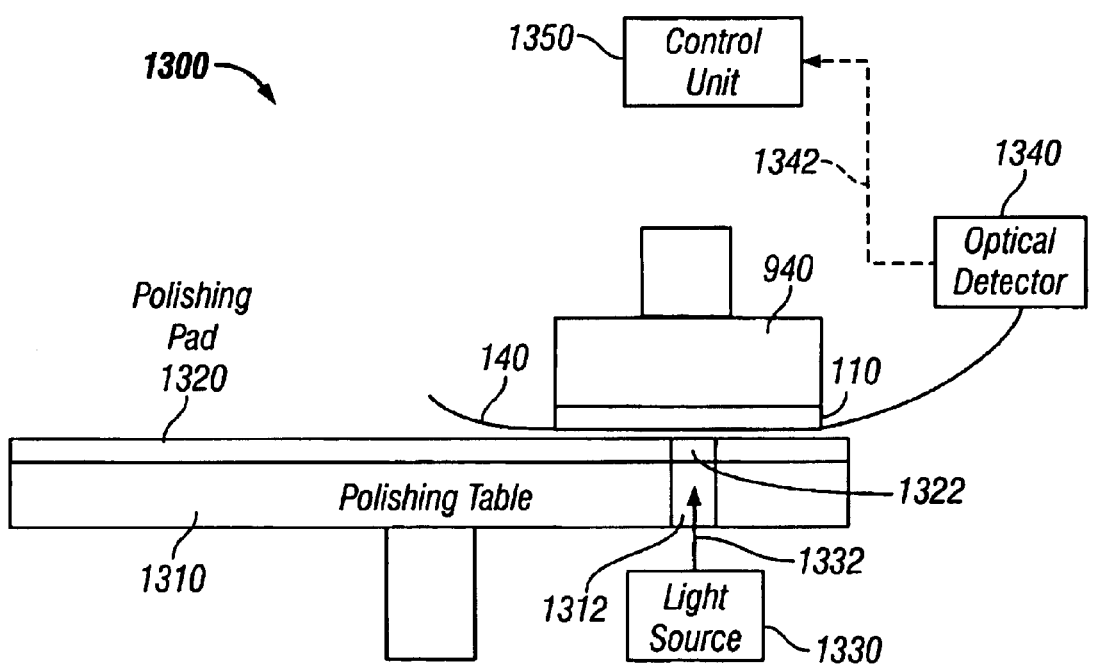
FIG. 13 shows one embodiment of an optical polishing monitor system that is used in a CMP polisher.

FIG. 13 shows a first embodiment of an optical endpoint monitoring system 1300 based on optical coupling of external light into the fiber through the side-polished surface. The illustrated system is an example in a CMP polishing system where the substrate 110 and one or more fibers engaged therein are held by the support unit 940. An optical detector 1340 is used to receive light output from one end of each fiber 140. A light beam 1332 is directed to illuminate the side-polished cladding surface of each fiber 140. A light source 1330 such as a laser may be used to produce the illumination beam 1332. The detector 1340 produces a detector signal 1342 which is sent to a control unit 1350 for processing and control operations. For a given fiber design and under a given illumination condition, the distance between the side-polished cladding surface and the amount of light coupled into the fiber has a known relationship. This relationship may be stored as a lookup table in the control unit 1350. A calibration process may be used to obtain the lookup table. Hence, the control unit 1350 controls the CMP polisher according to the measured light intensity. When the measured light intensity matches a predetermined intensity, the polishing is terminated.

In the illustrated system 1300, the polishing table 1310 is designed to have a transparent window or aperture 1312 to allow transmission of the illumination beam 1332. The polishing pad 1320 is also designed to have a transparent window or aperture 1322 that overlaps with the window 1312. The laser light is picked up by the partially polished fibers 140. The light coupled into each fiber 140 is then transmitted through to the pig tails of the assembly where detectors measure the intensity of the transmitted light. Each fiber is coupled to a designated detector 1340. Hence, if the substrate 110 has an array of fibers 140, there are the same number of detectors 1350 to respectively receive and measure the transmitted beams from different fibers. Polishing is stopped when the detector receives the light intensity associated with the final desired polishing of the fiber.

The light source 1330 may be located beneath the polishing turntable 1310. The laser frequency may be selected to pass through the translucent polishing pad window and several dozen microns of slurry between the polishing pad and the substrate with an adequate remaining intensity. The slurry for CMP polishing may be a type that reduces light attenuation. In operation, the laser beam 1332 may be pulsed and the timing of the laser pulses and the arrival of the translucent pad window may be matched to illuminate the partially polished fibers. Upon illumination of the transmitted light beam 1332, a portion of the laser light is picked up by the partially polished fibers.

Figure 14A:
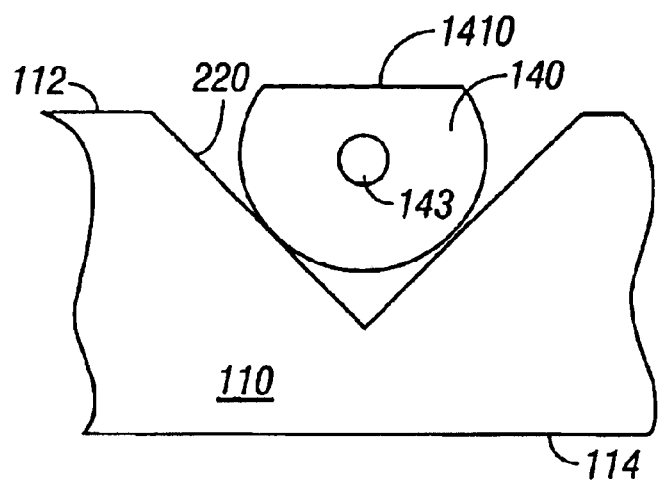
FIGS. 14A, 14B, 14C show different degrees of polishing that may be identified by the optical polishing monitor system.
Figure 14B:
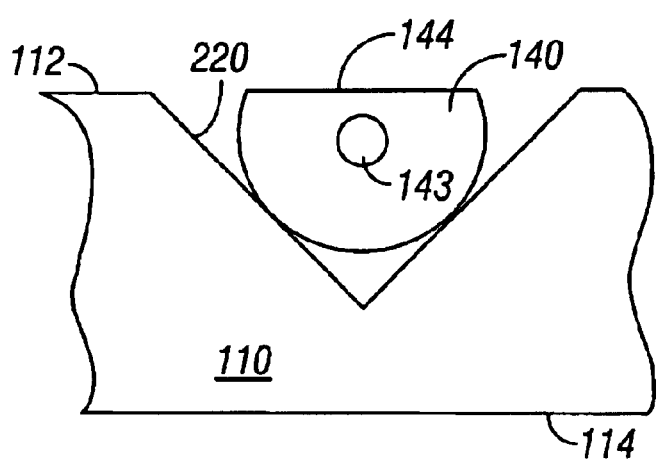
Figure 14C:
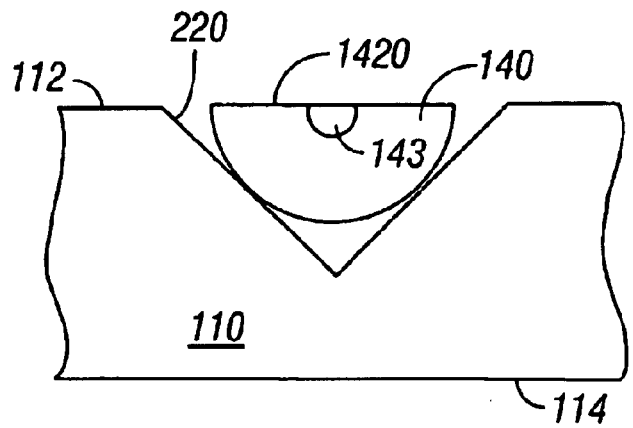

The degree of transmission is associated with the degree of polishing. FIGS. 14A, 14B, and 14C illustrate three examples with different amount of cladding removal. In FIG. 14A, the fiber cladding is under polished with respect to a desired polishing amount so that the light intensity in each fiber is less than the desired light intensity associated with the desired distance between the polished cladding surface 1410 and the fiber core. FIG. 14B shows the cladding surface 144 is at the desired distance from the fiber core. The light intensity measured by the detector 1340 is equal to the desired light intensity. If the polishing continues, the measured light intensity will become greater than the desired intensity and will continue to increase until the boundary of the fiber core is reached. Under this condition, the fiber cladding is over polished. After the fiber core begins to be removed as shown in FIG. 14C, the measured light intensity decreases because less light can be coupled into the fiber in the polished region.

Figure 15:
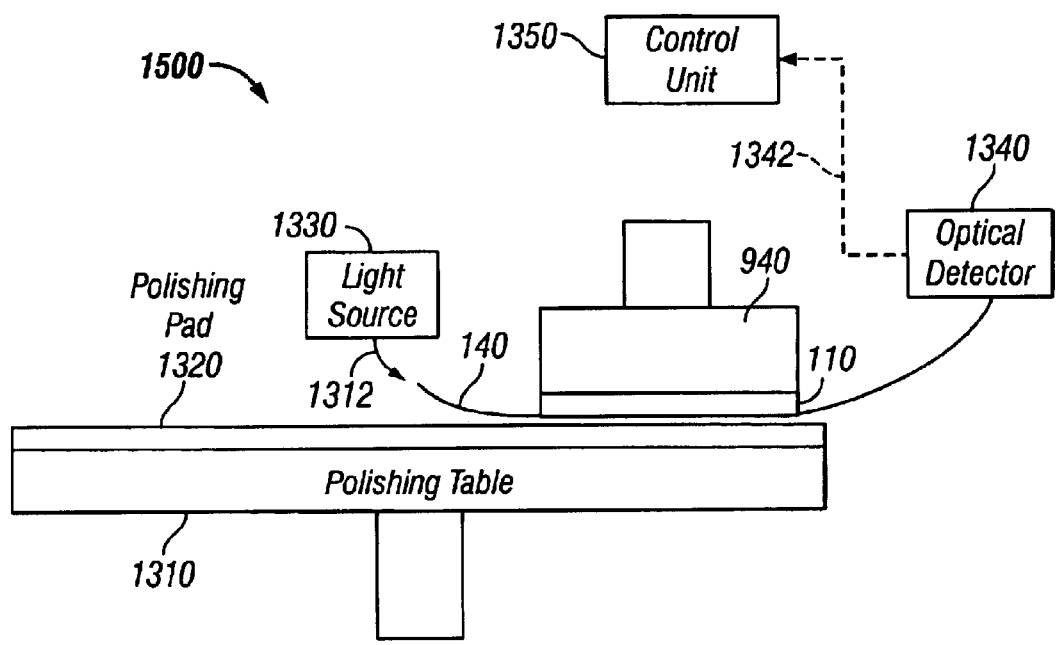
FIG. 15 shows another embodiment of optical polishing monitor system that is used in a CMP polisher.

FIG. 15 shows another implementation 1500 of the above optical monitoring technique where the light beam 1332 is coupled into one end facet of each fiber 140 rather than from the side-polished cladding surface. Optical leakage through the side-polished cladding surface causes a decrease in the transmitted light at the other end of the fiber. Hence, the loss of the laser light loss is measured the other end of each fiber to determine the amount of polishing. The polishing slurry for CMP may be a type that reduces light attenuation and optical properties can be adjusted to achieve maximum light coupling.

Only a few embodiments are disclosed. However, it is understood that variations and enhancements may be made without departing from the spirit of and are intended to be encompassed by the following claims.

What is claimed is:

1. A method, comprising:
   placing fibers in respective grooves formed on a substrate;
   fixing the fibers in the grooves;
   placing the substrate and fibers fixed therein in a protection template assembly to expose only fiber portions to be polished and shield remaining fiber portions;
   engaging the protection template assembly holding the substrate and the fibers to a polisher; and
   polishing exposed portions of the fibers with the polisher to remove a portion of the fiber cladding in each fiber to form a side-polished surface.

2. The method as in claim 1, wherein the polishing includes mechanical polishing.

3. The method as in claim 1, wherein the polishing includes chemical mechanical polishing.

4. The method as in claim 3, further comprising using at least one polyurethane polishing pad to perform the polishing.

5. The method as in claim 3, further comprising stacking the polyurethane polishing pad on a soft polishing pad and contacting the polyurethane polishing pads to the substrate and the exposed fiber to perform the polishing.

6. The method as in claim 3, further comprising using at least one polishing pad with a patterned surface to perform the polishing.

7. The method as in claim 3, further comprising using at least one polishing pad with a flat surface to perform the polishing.

8. The method as in claim 3, further comprising using at least one polishing pad embedded with an abrasive material to perform the polishing.

9. The method as in claim 8, wherein the polishing pad has a patterned surface which is embedded with the abrasive material, the method further comprising contacting the patterned surface with the substrate and exposed fiber to perform the polishing.

10. The method as in claim 3, further comprising supplying a polishing material for the chemical mechanical polishing at a flow rate in a range from a few milli liters per minute min to few hundred milli liters per minute.

11. The method as in claim 10, further comprising providing abrasive particles in the polishing material to assist the polishing, wherein the abrasive particles include at least one of silica particles, alumina particles, ceria particles, metal oxide particles, nitride particles, carbide particles, alloy particles, diamond particles and composite particles.

12. The method as in claim 10, wherein the polishing material has a pH value in a range from about 2 to about 12.

13. The method as in claim 10, wherein the polishing material does not include abrasive particles.

14. The method as in claim 10, wherein the polishing material is a slurry.

15. The method as in claim 10, wherein the polishing material is a solution.

16. The method as in claim 3, further comprising pressing the protection template assembly holding the substrate and the fibers against a polishing pad at a pressure from about 0.1 to about 20 psi during the polishing.

17. The method as in claim 1, wherein the grooves are fabricated on a single side of the substrate.

18. The method as in claim 1, wherein the grooves are fabricated on both sides of the substrate.

19. The method as in claim 1, further comprising:
    prior to placing the fibers in the respective grooves, fabricating a through hole at one end of a groove; and
    passing a fiber through the through hole when engaging the fiber to the substrate.

20. The method as in claim 1, further comprising using a top surface of the substrate as a mark for polishing and stopping polishing when a polished fiber portion surface becomes substantially coplanar with the top surface of the substrate.

21. The method as in claim 1, further comprising removing both a portion of the fiber cladding and a layer of the substrate by the polishing to form the side-polished surface in each fiber.

22. The method as in claim 1, wherein each groove has a predetermined depth to allow for an amount of the substrate to be removed from a top surface in order to achieve a desired amount of removal in each fiber, the method further comprising continuing to polish, after protruded portions of the fibers above the substrate are removed, to remove both fiber cladding and the substrate until said desired amount of removal in each fiber is achieved.

23. The method as in claim 1, further comprising using two polishing pads to polish the substrate on both sides at the same time.

24. The method as in claim 1, further comprising:
    providing a second protection template assembly to hold another substrate with grooves to hold fibers, wherein the protection template assembly and the second protection template assembly have gears around their edges;
    engaging the second protection template assembly to the protection template assembly by the gears around their edges; and
    placing the engaged protection template assembly and second protection template assembly on the polisher; and
    simultaneously polishing fibers in both sides of substrates.

25. The method as in claim 1, further comprising:
    coupling a monitor beam into each fiber under polishing;
    measuring output light from one end of each fiber;
    using the measured light intensity to determine a degree of cladding removal.

26. The method as in claim 25, further comprising controlling the polishing based on the measured light intensity.

27. The method as in claim 25, wherein the monitor beam is coupled from an end of each fiber.

28. The method as in claim 25, wherein the monitor beam is coupled into each fiber from a polished surface formed from removing fiber cladding by the polishing.

29. The method as in claim 25, further comprising applying a polishing slurry or solution to assist the polishing, wherein the polishing slurry or solution is selected to reduce light attenuation and to increase light coupled in fiber.

30. A method, comprising:
    placing fibers fixed to a substrate in a protection template assembly to expose only fiber portions to be polished and a corresponding substrate underlying the fiber portions in a central void of the protection template assembly and to place remaining fiber portions in grooves fabricated in a peripheral portion of the protection template assembly; and
    placing the protection template assembly in a polisher to position the fiber portions to be polished and a corresponding substrate underlying the fiber portions at a location to which a polishing pad of the polisher can access.

31. The method as in claim 30, wherein the remaining fiber portions are fixed to the grooves in the peripheral portion of the protection template assembly.

32. The method as in claim 31, wherein an adhesive material is used to fix the remaining fiber portions.

33. A method for fabricating side-polish fiber devices, comprising:

placing fibers in respective grooves formed on a substrate;

fixing the fibers in the grooves;

using a chemical mechanical polishing system to remove and polish one side of fiber cladding of a selected portion in each fiber to form a side-polished surface within a reach of an evanescent field of guided light in each fiber;

coupling a monitor optical beam into each fiber;

measuring output light from one end of each fiber to determine a degree of cladding removal; and using the measurement to terminate polishing.

* * * * *